United States Patent [19]

Glanz et al.

[11] 4,217,162

[45] Aug. 12, 1980

[54] PROCESS FOR MAKING FORM SETS FROM CARBONLESS COPY PAPER SHEETS

[75] Inventors: Kenneth D. Glanz; William J. Becker; Robert E. Miller, all of Appleton, Wis.

[73] Assignee: Appleton Papers Inc., Appleton, Wis.

[21] Appl. No.: 928,105

[22] Filed: Jul. 26, 1978

[51] Int. Cl.[2] .......................... B41L 1/24; B32B 31/24; B32B 7/12; B32B 7/06

[52] U.S. Cl. .................................. 156/305; 11/1 AD; 156/314; 156/319; 156/344; 281/21 R; 282/9 R; 282/24 R; 282/27.5; 282/DIG. 5; 427/146; 427/152; 427/208.8; 427/208.6; 427/285; 427/326; 427/411; 428/194; 428/530

[58] Field of Search .............. 11/1 AD; 156/280, 291, 156/295, 305, 314, 319, 344; 281/16, 21 R; 282/9 R, 22 R, 24 R, 27.5, DIG. 2; 427/146, 152, 207 C, 207 D, 285, 326, 411; 428/194, 498, 530

[56] References Cited

U.S. PATENT DOCUMENTS

| | | | |
|---|---|---|---|
| 2,130,530 | 9/1938 | Fletcher | 427/326 |
| 3,393,925 | 7/1968 | Calvert | 156/305 X |
| 3,960,638 | 6/1976 | Ogata et al. | 156/305 |
| 3,963,553 | 6/1976 | Kiritani et al. | 156/305 |
| 3,970,500 | 7/1976 | Ishizuka et al. | 156/305 |
| 3,970,501 | 7/1976 | Miyamoto et al. | 156/305 |
| 4,041,193 | 8/1977 | Hayashi et al. | 427/151 |

FOREIGN PATENT DOCUMENTS

| | | |
|---|---|---|
| 49-99635 | of 1974 | Japan . |
| 53-12844 | of 1978 | Japan . |
| 53-12855 | of 1978 | Japan . |
| 1263510 | 9/1972 | United Kingdom . |

*Primary Examiner*—John T. Goolkasian

*Assistant Examiner*—Robert A. Dawson

*Attorney, Agent, or Firm*—Birch, Stewart, Kolasch & Birch

[57] ABSTRACT

A process for separating a collated stack of carbonless copy paper sheets into form sets, which comprises pretreating the edge of the stack of sheets to be padded with water or an aqueous solution or dispersion, drying, applying an adhesive composition, drying and separating the unit sets.

7 Claims, No Drawings

PROCESS FOR MAKING FORM SETS FROM CARBONLESS COPY PAPER SHEETS

BACKGROUND OF THE INVENTION

1. Field of the Invention

The present invention pertains to a process for producing a series of unit set multi-ply carbonless copy paper forms from a stack (lift) of collated sheets. More specifically, the invention relates to a pretreatment or priming of the edge of the lift to which adhesive is to be applied (padded) with water or an aqueous solution or dispersion. The pretreated edge is then dried, an edge-padding adhesive is applied, the edge is again dried and the lift is separated into individual multi-ply carbonless paper forms.

2. Description of the Prior Art

For many years carbonless copy paper has been made into form sets from a lift of collated sheets by applying an adhesive to one edge of the lift, drying the padded edge and fanning the lift into individual form sets. British Pat. No. 1,263,510 discloses an improvement in edge-padding performance by using as the adhesive a mixture of an aqueous solution of a gelatin derivative and an aqueous emulsion of a polymer. Further improvements in edge-padding are taught in U.S. Pat. Nos. 3,960,638; 3,963,553; 3,970,500; 3,970,501; and 4,041,193 where a naphthalene sulfonic acid-formaldehyde condensate is used in an edge-padding adhesive formulation in various combinations with materials such as water-soluble polymers, water-soluble binders, water-soluble metal salts, polymer emulsions, surface active agents and latexes. Japanese Pat. Publication Nos. 12844/1978 and 12845/1978 teach the use of a surface active agent with an aqueous solution of a synthetic polymer adhesive or an aqueous emulsion of a synthetic polymeric adhesive, respectively, in an edge-padding adhesive formulation. Japanese Pat. Disclosure No. 99635/1974 teaches an aqueous edge-padding adhesive composition comprising a vinyl acetatemaleic acid copolymer and various alcohols.

SUMMARY OF THE INVENTION

The present invention is concerned with a pretreatment process to improve the edge-padding behavior of carbonless copy paper. Carbonless copy paper either as manufactured or upon aging can possess a wide range of properties which relate to edge-padding performance. It has been discovered that pretreatment or priming of an edge of a lift of precollated carbonless copy paper sheets with water or an aqueous solution or dispersion results in an improvement in the edge-padding performance thereof.

It is an object of the present invention to provide a process for separating simply and correctly a stack of carbonless copy paper sheets into unit sets, while avoiding and overcoming many of the problems and deficiencies encountered in the prior art procedures.

Another object of the present invention is to provide materials which when utilized as a pretreatment or primer will render a stack of carbonless copy paper sheets capable of being edge-padded successfully with conventional edge-padding adhesives.

These and other objects and advantages of the present invention will be apparent to those skilled in the art from the following description.

DETAILED DESCRIPTION OF THE INVENTION

In the present invention "edge-padding" designates the process whereby form sets can be made from a stack of collated carbonless copy paper sheets by applying an adhesive to one edge of the stack, drying the adhesive and fanning the stack into individual form sets. When edge-padding is performed on carbonless copy paper combinations, the following type of sheets can be used: sheets produced by coating a microcapsule layer containing a color former on a support (CB or coated back); sheets produced by coating a color-developing layer on a support (CF or coated front); and sheets produced by coating a color-developing layer on one surface and the microcapsule layer on the other surface of a support (CFB or coated front and back).

The collated stack of carbonless copy paper sheets can be assembled in the sequence, for example, CB—CF, CB—CF, CB—CF, . . . , CB—CF, or CB—CFB—CFB— . . . —CF, CB—CFB—CFB— . . . —CF, . . . , CB—CFB—CFB— . . . —CF. When an adhesive composition is applied to one edge of the stack, dried and the dried stack is fanned, the sheets are selectively adhered and the stack separated into complete unit set forms. The unit forms take the configuration as described above, i.e., either CB—CF or CB—CFB—CFB— . . . —CF. Selective adherence occurs because the adhesive bonds the coated surfaces of the collated forms, but not the uncoated surfaces. When the dried stack is fanned, separation occurs between the uncoated surfaces. Thus, by this process a stack of carbonless copy paper is easily converted to a series of unit set forms which are then ready for use.

The above process is performed quite easily and simply with most carbonless copy paper. However, occasionally some carbonless copy paper sheets within the collated stack, as made or upon aging, will not respond satisfactorily to such an edge-padding treatment when prior art adhesives are used in a single step process. Bonding between sheets will sometimes occur between uncoated surfaces. This phenomenon is called blocking. Occasionally, the bonding between coated surfaces will be insufficient and bonding between uncoated surfaces will occur to such a degree that during fanning the sheets will separate at the coated interfaces. This phenomenon is called reverse padding in the case of two-part forms. Also, proper non-bonding between uncoated surfaces will sometimes be accompanied by weak bonding between some of the coated surfaces. In this case during fanning the stack separates, in part, into individual sheets. This situation is called fall-apart. The present invention makes it possible to overcome all of these problems.

Illustrative of the aqueous materials employed in the pretreatment or priming step of the process of the present invention are:

(1) water,
(2) aqueous solutions of inorganic salts (e.g. sodium tetraborate decahydrate, i.e., borax),
(3) aqueous solutions of dyes and
(4) aqueous dispersions such as latex emulsions (e.g., the edge-padding adhesives used in the prior art such as acrylic latex emulsions).

The suitable dyes include but are not limited to:

(a):

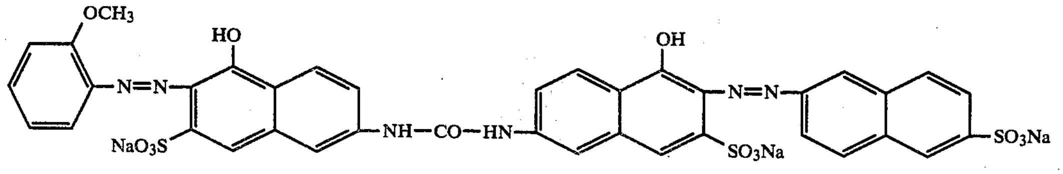

Direct Scarlet 4SWN (Crompton & Knowles) Color Index No. 29200

(b):

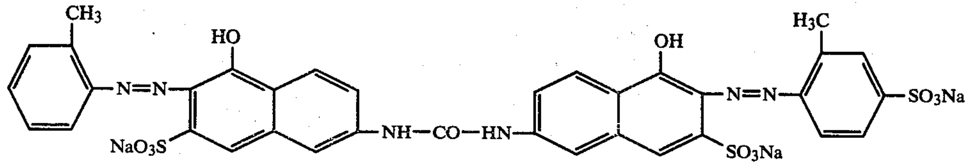

Pergasol Orange 3RSP (Ciba Geigy) Color Index No. 29175

(c):

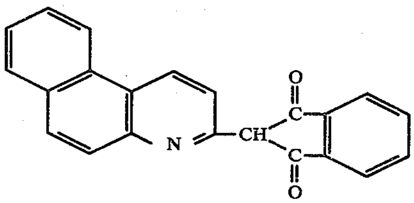

Calcomine Chinoline Yellow (American Cyanamid) Color Index No. 47035

Suitable aqueous dispersions include the prior art edge-padding adhesives which contain latex emulsions such as the following water-based formulation, the quantity of components being given as a weight percent:

| Adhesive Formulation | |
|---|---|
| 10.6% | acrylic latex solids |
| 20% | ethylene glycol monomethyl ether |
| 8% | denatured alcohol (denaturated 5 gallons of commercial methane per 100 gallons of 95% ethanol known as "Formula 3A") |

When water alone is used as a pretreatment, an increase in glue penetration and better bonding is observed in the coating-to-coating interfaces when compared to edge-padding with no pretreatment. When aqueous solutions or dispersions are used as a pretreatment material, an even further penetration of the adhesive in the coating-to-coating interfaces is observed.

The properties that such a pretreatment or priming material should possess to perform satisfactorily in the process of the present invention include:

(1) Non-interference with the functioning of the later applied edge-padding adhesive.

(2) Non-interference with the normal imaging of the carbonless paper imaging in the form.

(3) Will not adversely affect the edge-padding performance of sheets in the stack which, according to their own properties, would not have required a pretreatment process.

(4) Will "dry" or "set" quickly so that the adhesive application step can quickly follow the pretreatment step.

The pressure-sensitive or carbonless copy paper systems to be edge-padded by the process of the present invention can be any of the coated systems well known in the art. Pressure-sensitive mark-forming systems generally comprise sheet support material having unreacted mark-forming components disposed thereon and a liquid solvent in which one or both of the mark-forming components is soluble, said liquid solvent being present in such form that it is maintained in an isolated manner by a pressure-rupturable barrier from at least one of the mark-forming components until the application of pressure causes a breach of the barrier in the area delineated by the pressure pattern. The mark-forming components are thereby brought into reactive contact, producing a distinctive mark.

The pressure-rupturable barrier, which maintains the mark-forming components in isolation, preferably comprises a microencapsulated liquid solvent solution. The microencapsulation process utilized can be chosen from the many known in the art. Well known methods are disclosed in U.S. Pat. Nos. 2,800,457; 3,041,289; 3,533,958; 3,755,190; and 4,001,140. Any of these and other methods are suitable for encapsulating the chromogenic compounds used to coat paper edge-padded by the process of this invention.

The method of marking comprises providing a chromogenic compound and bringing such chromogenic compound into reactive contact, in areas where marking is desired, with an acidic color-developing substance to produce a dark-colored form of the chromogenic compound.

The acidic color-developing materials can be any compound within the definition of a Lewis acid, i.e., an electron acceptor. These materials include clay substances such as attapulgite, bentonite and montmorillonite and treated clays such as silton clay as disclosed in U.S. Pat. Nos. 3,622,364 and 3,753,761, materials such as silica gel, talc, feldspar, magnesium trisilicate, pyrophyllite, zinc sulfate, zinc sulfide, calcium sulfate, calcium citrate, calcium phosphate, calcium fluoride and barium sulfate, aromatic carboxylic acids such as salicylic acid, derivatives of aromatic carboxylic acids and metal salts thereof as disclosed in U.S. Pat. No. 4,022,936 and acidic polymeric materials such as phenol-formaldehyde polymers, phenol-acetylene polymers, maleic acid-rosin resins, partially or wholly hydrolyzed styrenemaleic anhydride copolymers and ethylene-maleic anhydride copolymers, carboxy polymethylene and wholly or partially hydrolyzed vinyl methyl ether maleic anhydride copolymers and mixtures thereof as disclosed in U.S. Pat. No. 3,672,935.

Particularly useful as acidic color-activating substances are the metal-modified phenolic resins. U.S. Pat. No. 3,732,120 discloses record sheet material coated with resins of this type. An example of a composition which can be coated onto the surface of a sheet for reaction with a chromogenic compound is as follows:

| Coating Composition | Percent by Weight |
|---|---|
| Zinc-modified phenolic polymer | 13.6 |
| Paper coating kaolin | 67.9 |
| Calcium carbonate | 6.0 |
| Styrene-butadiene latex | 6.0 |
| Etherified corn starch | 6.5 |

In the practice of the present invention, a stack of collated carbonless copy paper sheets is jogged to the edge to be edge-padded. Water or the aqueous solution or aqueous dispersion is applied to the edge with a brush or spray until a cascading effect is observed. The stack is allowed to dry, is fanned, is rejogged, and the edge-padding adhesive is applied in the normal fashion. After the adhesive dries, the stack is fanned into individual unit set forms.

An important parameter in successful edge-padding is obtaining an appropriate bond strength at each interface in the carbonless copy paper stack. A strong bond is desired between coated surfaces and no bond is desired between uncoated surfaces. In order to evaluate edge-padding performance, a semi-quantitative bond strength scale has been devised as follows:

0=no bond
1=very weak bond
2=weak bond
3=fair bond
4=good bond
5=excellent bond

Using this test, the following bond strength results were obtained with two form sets which had been difficult to edge-pad in the conventional manner, i.e., utilizing the prior art adhesive formulation set above with no pretreatment. As nonlimitative illustrative examples of the invention, the same sets were pretreated with water or an aqueous dye solution, dried and then edge-padded with the prior art adhesive. The resulting bonds of the form sets were evaluated by two skilled observers. Each observer evaluated each bond five times. Using the bond strength evaluation scale given previously, the total possible strength number for each bond ranges from 0 to 50, calculated in the following manner:

2 observers×5 tests×0 bond strength=0
2 observers×5 tests×5 bond strength=50

The results obtained are shown in the following table for the collated sheets as listed by type and basis weight (weight of 1300 ft$^2$ ream):

| | | Bond Strength Evaluation | | |
|---|---|---|---|---|
| Form Set Sequence | Bond Evaluated | (No pretreatment Prior Art Adhesive | Water pretreatment followed by prior Art Adhesive | 1% Pergasol Orange 3RSP dye in water pretreatment followed by prior Art Adhesive |
| 15 lb. CB | CB-CFB | 49 | 50 | 47 |
| 17 lb. CFB | CFB-CFB | 47 | 50 | 50 |
| 17 lb. CFB | CFB-CFB | 45 | 50 | 50 |
| 17 lb. CFB | CFB-CFB | 34 | 50 | 50 |
| 17 lb. CFB | CFB-CF | 30 | 44 | 46 |
| 15 lb. CF | CF-CB (uncoated sides) | 0 | 0 | 0 |
| 15 lb. CB | CB-CF | 44 | 50 | 50 |
| 15 lb. CF | CF-CB (uncoated sides) | 1 | 0 | 0 |

With the prior art adhesive, the first form set had three coating-to-coating bonds which were in the good to excellent range, one bond in the fair to good range and one bond which was fair. With both the water pretreatment and the dye solution pretreatment of the present invention all of the bonds improved in strength to a uniform good—excellent to excellent range. The CF—CB uncoated interface which had produced a favorable no bond strength with the prior art adhesive maintained this favorable situation upon the utilization of the pretreatment process. A high bond strength in the coating-to-coating interfaces and no bond at the uncoated interfaces are required to produce good forms and good separation during the edge-padding process. In this form set the bond strengths between the coated surfaces were improved by the application of the process of the present invention.

In the second form set the prior art adhesive produced a good to excellent bond at the coating-to-coating interface. However, the uncoated interface produced some bonding which hindered the separation of the forms after the edge-padding process. With the processes of the present invention the coating-to-coating interface was improved to an excellent bond and the uncoated interface was reduced to a desirable no bond. In this form set the bond strengths between the coated surfaces were improved and the ease of separation into individual forms was improved by the application of the process of the present invention.

Similar results are obtainable when utilizing an acrylic latex adhesive formulation which also contains a small amount (e.g., less than 1%) of a surface active agent such as "Tamol" (sodium salt of polymeric carboxylic acid).

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for making form sets from carbonless copy paper, comprising the steps of:

(a) applying to an edge of a stack of sheets of said copy paper an aqueous composition selected from the group consisting of water, aqueous solutions of inorganic salts, aqueous solutions of dyes and aqueous latex dispersions,
(b) drying said aqueous composition,
(c) applying an adhesive to said edge,
(d) drying said adhesive, and
(e) fanning said stack.

2. The process of claim 1, wherein the aqueous composition is an aqueous solution of an inorganic salt.

3. The process of claim 2, wherein the inorganic salt is sodium tetraborate decahydrate.

4. The process of claim 1, wherein the aqueous composition is water.

5. The process of claim 1, wherein the aqueous composition is an aqueous solution of a dye.

6. The process of claim 5, wherein the dye is

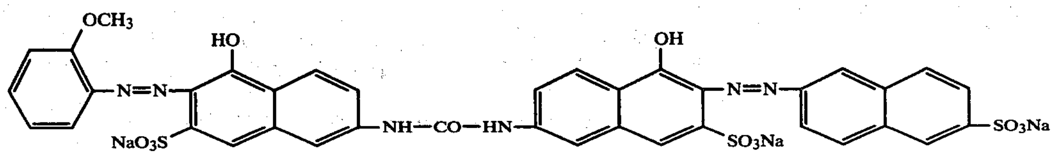

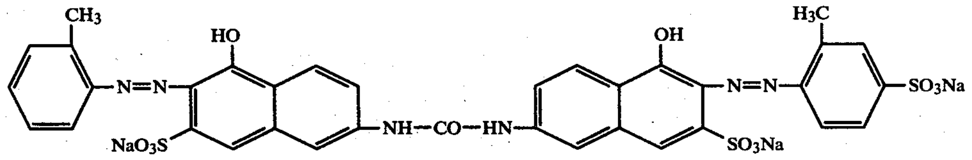

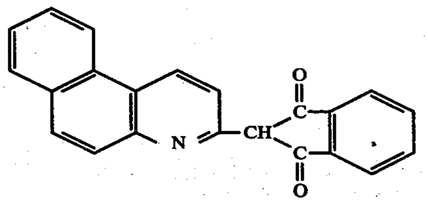

7. The process of claim 1, wherein the aqueous composition is an acrylic latex-containing adhesive.

* * * * *